(12) United States Patent
Andersson

(10) Patent No.: US 10,047,417 B2
(45) Date of Patent: Aug. 14, 2018

(54) CONTINUOUS CASTER ROLL FOR A CONTINUOUS CASTING MACHINE

(71) Applicant: Marcus C Andersson, Mölndal (SE)

(72) Inventor: Marcus C Andersson, Mölndal (SE)

(73) Assignee: AKTIEBOLAGET SKF, Gothenburg (SE)

(*) Notice: Subject to any disclaimer, the term of this patent is extended or adjusted under 35 U.S.C. 154(b) by 148 days.

(21) Appl. No.: 15/061,355

(22) Filed: Mar. 4, 2016

(65) Prior Publication Data
US 2016/0263648 A1 Sep. 15, 2016

(30) Foreign Application Priority Data

Mar. 11, 2015 (SE) .................................. 1550292

(51) Int. Cl.
| | |
|---|---|
| *B22D 11/128* | (2006.01) |
| *C22C 38/02* | (2006.01) |
| *C22C 38/50* | (2006.01) |
| *C22C 38/48* | (2006.01) |
| *C22C 38/44* | (2006.01) |
| *C22C 38/42* | (2006.01) |
| *C22C 38/04* | (2006.01) |
| *B23K 26/34* | (2014.01) |
| *F16C 13/00* | (2006.01) |
| *B23K 103/04* | (2006.01) |

(Continued)

(52) U.S. Cl.
CPC .......... *C22C 38/02* (2013.01); *B22D 11/1287* (2013.01); *B23K 26/34* (2013.01); *C22C 38/04* (2013.01); *C22C 38/42* (2013.01); *C22C 38/44* (2013.01); *C22C 38/48* (2013.01); *C22C 38/50* (2013.01); *B23K 2201/04* (2013.01); *B23K 2201/20* (2013.01); *B23K 2203/04* (2013.01); *F16C 13/00* (2013.01)

(58) Field of Classification Search
CPC ............................ B22D 11/1287; C22C 38/48
USPC .................................................. 164/442, 448
See application file for complete search history.

(56) References Cited

U.S. PATENT DOCUMENTS

| | | | | |
|---|---|---|---|---|
| 4,420,335 A | * | 12/1983 | Takagi | .................... C22C 38/20 420/60 |
| 5,305,522 A | * | 4/1994 | Nawata | .................... B21B 27/00 29/895.32 |

(Continued)

FOREIGN PATENT DOCUMENTS

| | | |
|---|---|---|
| EP | 2428301 A1 | 3/2012 |
| JP | H07173578 A | 7/1995 |

(Continued)

*Primary Examiner* — Kevin E Yoon
(74) *Attorney, Agent, or Firm* — Brian Peckjian; SKF USA Inc. Patent Dept.

(57) ABSTRACT

The present invention relates to a continuous caster roll for a continuous casting machine, having; a base portion and an overlay portion made of martensitic stainless steel. The steel of the overlay portion includes 12-14% by weight Cr (chromium), and the steel further includes 0.2-0.5% by weight Nb (niobium) which is a stronger carbide former than Cr, such that Cr will be kept in solid solution in the overlay portion. The balance being Fe (iron), other alloying elements and normally occurring impurities. In addition, a method to manufacture the continuous caster roll is disclosed, wherein the overlay portion is applied by any of weld cladding or laser cladding.

6 Claims, 3 Drawing Sheets

(51) Int. Cl.
  *B23K 101/04* (2006.01)
  *B23K 101/20* (2006.01)

(56) References Cited

U.S. PATENT DOCUMENTS

| | | | |
|---|---|---|---|
| 6,171,222 B1* | 1/2001 | Lakeland | B21B 27/00 |
| | | | 492/54 |
| 8,357,247 B2* | 1/2013 | Hirasawa | C22C 38/001 |
| | | | 148/310 |
| 2008/0073005 A1* | 3/2008 | Buck | C21D 6/004 |
| | | | 148/609 |
| 2011/0294636 A1 | 12/2011 | Lechner et al. | |

FOREIGN PATENT DOCUMENTS

| | | |
|---|---|---|
| JP | 2002001504 A | 1/2002 |
| JP | 2002371341 A | 12/2002 |

\* cited by examiner

CONTINUOUS CASTER ROLL FOR A CONTINUOUS CASTING MACHINE

TECHNICAL FIELD

The present invention relates to continuous casting of steel. More particularly, according to a first aspect, the invention regards a continuous caster roll (or roll mantle) of a continuous casting machine, for supporting and guiding a steel slab during the continuous casting process. According to a second aspect, the invention regards a method to manufacture a continuous caster roll according to the first aspect of the invention.

BACKGROUND

Continuous casting machines (CCM) for slab casting are very large and complex production units. The height of the machines is approximately 20 meters (bow radius of around 10 meters) and 30 meters in length. The strand of the CCM consists in general of approximately 200 roll lines (400-600 rolls depending on one- or two-split design) with varying diameter (140-320 mm in diameter) that are cooled both internally and externally. A schematic picture of the strand can be seen in FIG. 1.

The mold is water cooled internally to solidify the liquid metal directly in contact with it. This cooling is referred to as primary cooling, see FIG. 1. The surface of the slab is approximately 1500° C. just below the mold at the foot rolls and decreases continuously to around 800-900° C. at the horizontal part of the strand. The cooling of the slab (and the rollers) is divided into internal cooling and external spray water cooling (secondary cooling). The top rolls (foot rolls) are only water cooled externally, while the rest of the rolls are water cooled internally by e.g. using center bore design, revolver design or spiral bore design.

The entire slab is spray cooled externally with air mist or water. The nozzles may be placed in such a way that the water sprays between the rolls in order to maximize the cooling of the slab. The combination of very high temperatures and a wet and humid environment in the strand results in extremely harsh conditions for the casting mill equipment in general and for the caster rolls in particular. The low alloyed caster rolls are therefore coated with stainless steel using hardfacing (for example weld or laser cladding). This will dramatically improve the caster roll surface resistance to failure mechanisms and thereby increase the total service life time of the CCM.

There are two types of roll failure mechanisms, catastrophic failure and surface deterioration. Catastrophic failure includes neck breakages, cracks through the body or melted bodies due to break-outs in the strand. Breakages or cracks are very rare as the core bodies of today are shorter (one or two split caster roll lines) compared to earlier generation full-body caster rolls. Break-outs are also less common today due to advanced modern production control systems.

Regarding surface deterioration, the service conditions of the caster rolls (also known as roll mantles) are complex and vary dependent on the roll location within the strand and the roll line. However, it is well known that the most exposed roll line location is where the slab changes its direction from vertical to horizontal. The middle position of the roll line is also more prone to deterioration compared to the flank positions. There are many different failure mechanisms responsible for the surface deterioration and they can be summarized in the areas of corrosion, wear and fatigue.

SUMMARY OF THE INVENTION

In view of the above, an object of the present invention is to provide a new continuous caster roll, which is able to better withstand the harsh environment in the continuous casting machine. In addition, an object of the invention is to provide a continuous caster roll which has an improved corrosion, fatigue and wear resistance.

These and other objects are met by the subject matters provided in the independent claims. Preferred and non-limiting exemplary embodiments can be found in the dependent claims and in the accompanying description.

According to the first aspect of the invention, the objects are achieved by a continuous caster roll for a continuous casting machine. The continuous caster roll comprises a base portion and an overlay portion made of martensitic stainless steel. The steel of the overlay portion comprises 12-14 weight % Cr (chromium), and the steel further comprises 0.2-0.5 weight % Nb (niobium) which is a stronger carbide former than Cr, such that Cr will be kept in solid solution in the overlay portion. The balance being Fe (iron), other alloying elements and normally occurring impurities.

The corrosion resistance is to a large extent depending on the chromium content. By alloying with Cr and maintaining it in solid solution, Cr oxidizes at the alloy/oxide interface as $Cr_2O_3$. Since $Cr_2O_3$ has a low solubility in FeO it remains as islands in a matrix of FeO. When the content of free Cr exceeds approximately 12 weight % and a temperature of 1000° C. is not exceeded, a dense, continuous and stable $Cr_2O_3$ film is formed at the surface. The most common (weld clad) overlay is therefore a martensitic 12% Cr stainless steel as it has a good balance between corrosion resistance and cost. However, the inventor has realized that these materials are very vulnerable for sensitization, which means that chromium nucleates as chromium carbides. This issue has been found to be common in weld cladded caster roll overlays, which are used in the very harsh environments of continuous casting machines. This results in a local reduction of chromium in solid solution (sensitization) and the protective surface oxide degrades locally. It has therefore been realized that it is essential to add elements that are stronger carbide formers compared to chromium, which will trap the carbon by forming carbides and keep the chromium in solid solution. The inventor has further realized that the addition of Nb as a carbide former has been very successful, from both a performance and cost perspective, if it is correctly balanced with the carbon content. Furthermore, these carbides have a tendency to nucleate with a very inhomogeneous distribution along the martensite/O-ferrite grain boundaries and this phenomenon is further facilitated by the weld clad process due to multiple reheating. By tailoring the carbide phase precipitation, a more homogeneous distribution can be obtained and thereby a better corrosion resistance.

The wear and fatigue resistance is also very dependent on an intact and high quality surface and will therefore also benefit from good corrosion resistance. Furthermore, a dense and homogeneous distribution of small particles will also improve the wear (increased hardness) and fatigue resistance (hindering of dislocation movement and less stresses at the grain boundaries).

In an embodiment, the base material is made of steel, such as a high temperature construction steel (for example 21CrMoV5-11, 25CrMo4, 16CrMo4, S355J2 etc) with a maximum carbon content of 0.3 weight %. The hardfacing overlay (overlay portion) may be built-up with one layer or more.

In an embodiment, the steel of the overlay portion comprises 0.2-0.35 weight % Nb.

In an embodiment, the steel of the overlay portion comprises 0.3-0.5 weight % Nb.

In an embodiment, the steel of the overlay portion further comprises 1-2.5 weight % Cu (copper).

In an embodiment, the steel of the overlay portion further comprises 0.2-0.35 weight % Zr (zirconium). It has namely been found that the Zr will mainly create MC carbides at temperatures above 1000° Celcius.

In an embodiment, the overlay portion is a martensitic stainless steel with less than 10 volume percent delta ferrite. The chemical composition of the overlay portion should be optimized for corrosion, wear and fatigue resistance. This means that chromium should be kept in solid solution. The carbide phases with the highest driving force from a thermodynamic point of view below 1000° C. is the $M_{23}C_6$ and $M_7C_3$ phase, were M is the total amount of the carbide formers like Cr, Mo, W, V, Nb, Ta, Ti, Zr and Hf. Considering the ratio between carbide formers and carbon content (M divided by C), the $M_{23}C_6$ and $M_7C_3$ phase requires significant amount of carbide formers:

$$\frac{M}{C} = \frac{23}{6} = 3,83 \text{ and } \frac{M}{C} = \frac{7}{3} = 2,33$$

The idea is therefore to nucleate the MC carbide phase that are thermodynamic stable above 1000° C. and thereby trap all the carbon during solidification. In this way, all the carbon will be depleted before the other carbide phases become stable. The MC carbide phase has a M/C ratio of 1, which will be more beneficial from an economical point of view as the carbide formers can be minimized. In addition, this carbide phase nucleate in a denser and more homogeneous way compared to the $M_{23}C_6$ and $M_7C_3$ phases. The chemical composition of the weld clad overlay surface should therefore have a ratio (M/C) in atomic percent between 0.8 and 1.2, were M is the total amount of MC carbide forming elements like V, Nb, Ta, Ti, Zr and Hf. As chromium is a relatively weak carbide former compared to above mentioned elements, it will stay in solid solution while the other carbide forming elements will nucleate with carbon and form stable MC carbides.

In an embodiment, the overlay portion presents a carbon content below 0.10 weight % in order to minimize carbide formation and thereby optimizing the corrosion resistance. This results in a decreased hardness, which influences the wear resistance in a negative way. This will be compensated by adding between 1.0 and 2.0 atomic percent Cu, which nucleates as intermetallic precipitates during the hardfacing process and the potential subsequent heat treatment. The Cu-rich precipitates will substitute the carbides and provide a hardness exceeding 37 HRC. In addition, they nucleate as nano-scaled precipitates with a very dense and homogeneous distribution compared to the inhomogeneous distribution of $M_{23}C_6$ and $M_7C_3$ carbides. This will also have a positive impact on the fatigue and wear resistance of the hardfacing overlay.

In an embodiment, the steel of the overlay portion may have the following composition:

| Elements | Lower limit | | Target | | Higher limit | |
|---|---|---|---|---|---|---|
| | at. % | wt. % | at. % | wt. % | at. % | wt. % |
| C | 0.23 | 0.05 | 0.32 | 0.07 | 0.41 | 0.09 |
| Mn | 0.70 | 0.70 | 1.01 | 1.00 | 1.31 | 1.30 |
| Si | 0.79 | 0.40 | 1.18 | 0.60 | 1.57 | 0.80 |
| Cr | 12.76 | 12.00 | 13.81 | 13.00 | 14.85 | 14.00 |
| Ni | 2.59 | 2.75 | 3.06 | 3.25 | 3.53 | 3.75 |
| Mo | 0.23 | 0.40 | 0.35 | 0.60 | 0.46 | 0.80 |
| Nb | 0.12 | 0.20 | 0.15 | 0.25 | 0.21 | 0.35 |
| Cu | 0.87 | 1.00 | 1.30 | 1.50 | 1.74 | 2.00 |
| Zr | 0.12 | 0.20 | 0.18 | 0.30 | 0.21 | 0.35 |
| M/C ratio | 1.04 | | 1.03 | | 1.01 | | the balance being Fe (iron) and normally occurring impurities.

In an embodiment, the hardfacing overlay should be a martensitic stainless steel with less than 10 volume percent delta ferrite. The chemical composition of the overlay surface should be optimized for corrosion, wear and fatigue resistance. This means that chromium should be kept in solid solution. The carbide phase with the highest driving force from a thermodynamic point of view (below 1000° C.) is the $M_{23}C_6$, followed by the $M_7C_3$ phase, were M is the total amount of the carbide formers Cr, Mo, W, V, Nb, Ta, Ti, Zr and Hf. Considering the ratio between carbide formers and carbon content (M divided by C), the $M_{23}C_6$ phase also requires most carbide formers in atomic percent:

$$\frac{M}{C} = \frac{23}{6} = 3,83 \text{ and } \frac{M}{C} = \frac{7}{3} = 2,33$$

The chemical composition of the weld clad overlay surface should therefore have a ratio (M/C) in atomic percent between 2.3 and 3.8, where M is the total amount of Mo, W, V, Nb, Ta, Ti, Zr and Hf. As chromium is a relatively weak carbide former compared to above mentioned elements, it will stay in solid solution while the other carbide forming elements will nucleate with carbon and form stable carbides.

In an embodiment, the steel of the overlay portion may have the following composition:

| Elements | Lower limit | | Target | | Higher limit | |
|---|---|---|---|---|---|---|
| | at. % | wt. % | at. % | wt. % | at. % | wt. % |
| C | 0.23 | 0.05 | 0.32 | 0.07 | 0.41 | 0.09 |
| Mn | 0.70 | 0.70 | 1.01 | 1.00 | 1.31 | 1.30 |
| Si | 0.79 | 0.40 | 1.18 | 0.60 | 1.57 | 0.80 |
| Cr | 12.76 | 12.00 | 13.28 | 12.50 | 13.79 | 13.00 |
| Ni | 3.30 | 3.50 | 3.76 | 4.00 | 4.23 | 4.50 |
| Mo | 0.40 | 0.70 | 0.58 | 1.00 | 0.75 | 1.30 |
| Nb | 0.18 | 0.30 | 0.24 | 0.40 | 0.30 | 0.50 |
| M/C ratio | 2.52 | | 2.56 | | 2.56 | | the balance being Fe and normally occurring impurities.

In an embodiment, the hardfacing overlays should have a carbon content below 0.10 weight percent in order to minimize carbide formation and thereby optimizing the corrosion resistance. This results in a decreased hardness, which influences the wear resistance in a negative way. This will be compensated by adding between 1.0 and 2.0 atomic percent Cu, which nucleates as intermetallic precipitates during the hardfacing process and the potential subsequent heat treatment. The Cu-rich precipitates will substitute the carbides and provide a hardness exceeding 37 HRC. In addition, they nucleate as nano-scaled precipitates with a denser and more homogeneous distribution compared to the inhomogeneous distribution of $M_{23}C_6$ and $M_7C_3$ carbides. This will also have a positive impact on the fatigue and wear resistance of the hardfacing overlay.

In an embodiment, the steel of the overlay portion may have the following composition:

| Elements | Lower limit | | Target | | Higher limit | |
|---|---|---|---|---|---|---|
| | at. % | wt. % | at. % | wt. % | at. % | wt. % |
| C | 0.23 | 0.05 | 0.32 | 0.07 | 0.41 | 0.09 |
| Mn | 0.71 | 0.70 | 1.01 | 1.00 | 1.31 | 1.30 |
| Si | 0.79 | 0.40 | 1.18 | 0.60 | 1.58 | 0.80 |
| Cr | 12.78 | 12.00 | 13.84 | 13.00 | 14.89 | 14.00 |
| Ni | 2.83 | 3.00 | 3.54 | 3.75 | 4.24 | 4.50 |
| Mo | 0.40 | 0.70 | 0.58 | 1.00 | 0.75 | 1.30 |
| Nb | 0.18 | 0.30 | 0.24 | 0.40 | 0.30 | 0.50 |
| Cu | 1.31 | 1.50 | 1.74 | 2.00 | 2.18 | 2.50 |
| M/C ratio | 2.52 | | 2.56 | | 2.56 | | the balance being Fe and normally occurring impurities.

According to a second aspect of the invention, the objects are achieved by a method to manufacture a continuous caster roll according to any of the embodiments of the first aspect of the invention, wherein the overlay portion is applied onto the base portion by any of weld cladding or laser cladding.

In an embodiment, the manufacturing method is a hardfacing method. In another embodiment, the weld cladding is either submerged arc or open arc welding.

BRIEF DESCRIPTION OF DRAWINGS

Exemplifying embodiments of the present invention will now be described in more detail, with reference to the accompanying drawings, wherein.

Figure 1:
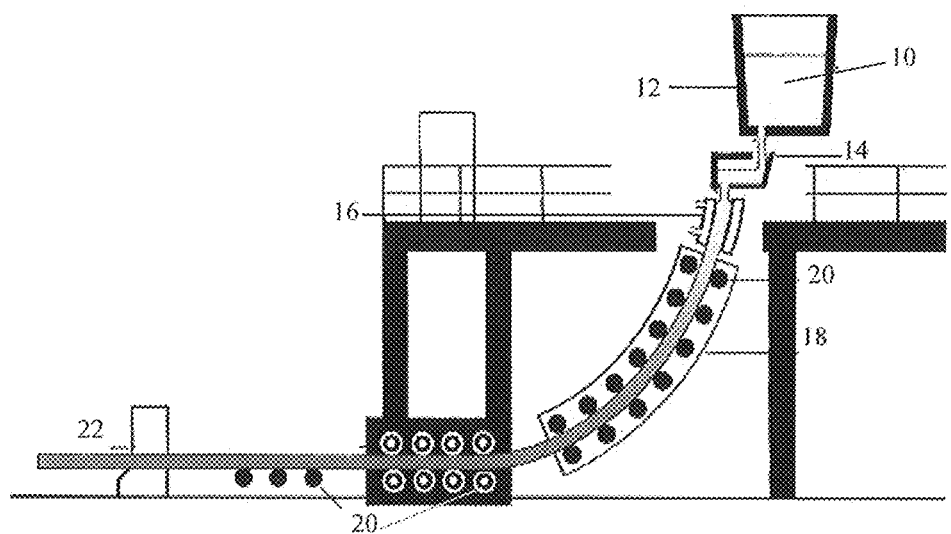
FIG. 1 shows an example of a continuous casting machine.

The drawings show diagrammatic exemplifying embodiments of the present invention and are thus not necessarily drawn to scale. It shall be understood that the embodiments shown and described are exemplifying and that the invention is not limited to these embodiments. It shall also be noted that some details in the drawings may be exaggerated in order to better describe and illustrate the invention.

DETAILED DESCRIPTION

FIG. 1 shows a continuous slab casting process in which molten metal 10 is tapped into a ladle 12. After undergoing any ladle treatments, such as alloying and degassing, and arriving at the correct temperature, molten metal 10 from the ladle 12 is transferred via a refractory shroud to a tundish 14. Metal is drained from the tundish 14 into the top of an open-base mould 16. The mould 16 is water-cooled to solidify the molten metal directly in contact with it. In the mould 16, a thin shell of metal next to the mould walls solidifies before the middle section, now called a slab, exits the base of the mould 16 into a cooling chamber 18; the bulk of metal within the walls of the slab is still molten. The slab is supported by closely spaced, water cooled roll lines 20 which act to support the walls of the slab against the ferrostatic pressure of the still-solidifying liquid within the slab. To increase the rate of solidification, the slab is sprayed with large amounts of water as it passes through the cooling chamber 18. Final solidification of the slab may take place after the slab has exited the cooling chamber 18.

In the illustrated embodiment the slab exits the mould 16 vertically (or on a near vertical curved path) and as it travels through the cooling chamber 18, the roll lines 20 gradually curve the slab towards the horizontal plane. (In a vertical casting machine, the slab stays vertical as it passes through the cooling chamber 18).

After exiting the cooling chamber 18, the slab passes through straightening roll lines (if cast on other than a vertical machine) and withdrawal roll lines. Finally, the slab is cut into predetermined lengths by mechanical shears or by travelling oxyacetylene torches 22 and either taken to a stockpile or the next forming process. In many cases the slab may continue through additional roll lines and other mechanisms which might flatten, roll or extrude the metal into its final shape.

Figure 2:
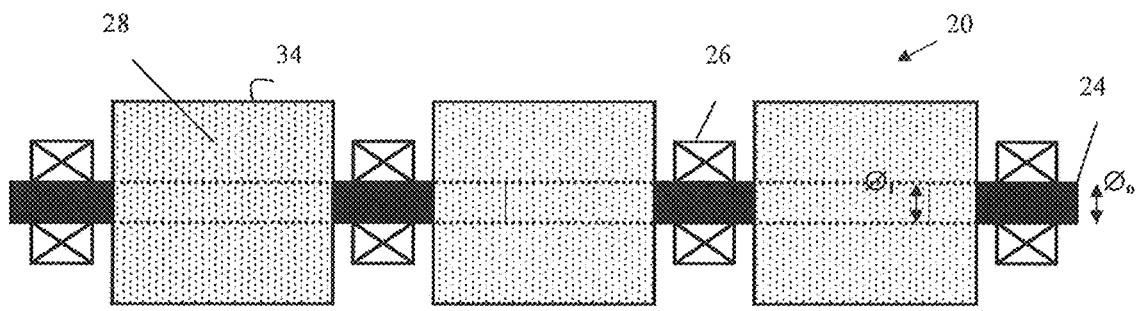
FIG. 2 shows an example of a roll line.

FIG. 2 shows a roll line 20 according to an embodiment of the present invention, namely a common shaft roll line 20. The roll line 20 comprises a shaft 24 having an outer diameter $Ø_o$ and supported by bearings 26 housed in bearing housings, and a plurality of continuous caster rolls (or roll mantles) 28 for transporting a metal slab along the outer surface 34 thereof, having a corresponding inner diameter $Ø_i$ which are arranged to be fixedly supported on the shaft 24.

Figure 3:
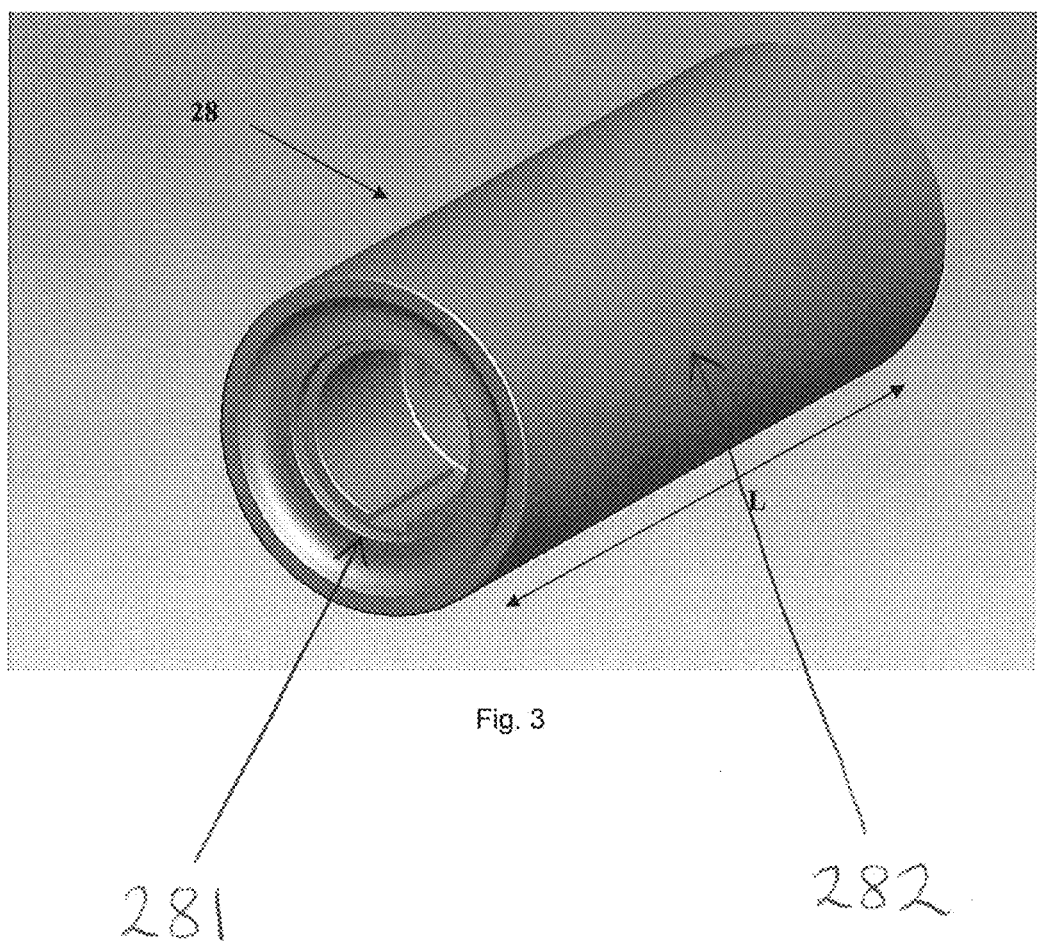
FIG. 3 shows an example of a continuous caster roll for a continuous casting machine according to an embodiment of the invention.

FIG. 3 is a cross section of a continuous caster roll 28 according to an embodiment of the invention. The roll is cylinder-shaped with an axial extension L and comprises a base portion 281 and an overlay portion 282 (corresponding to the outer surface 34 in FIG. 2). The base portion can be made of any kind of steel, preferably a high temperature construction steel. The overlay portion is made of a martensitic stainless steel, which comprises 12-14 weight % of Cr. The steel further comprises 0.2-0.5 weight % Nb which is a stronger carbide former than Cr, such that Cr will be kept in solid solution in the overlay portion. The balance being Fe, other alloying elements and normally occurring impurities.

Figure 4:
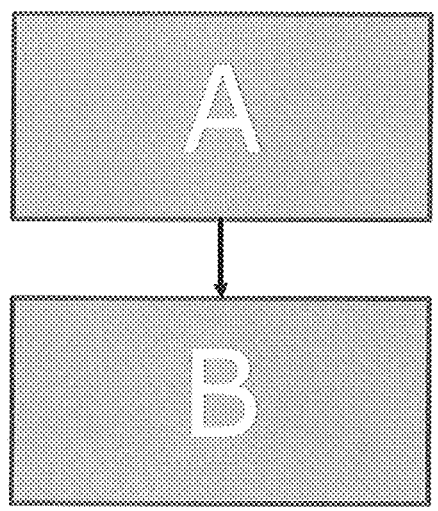
FIG. 4 shows a flow chart of a method according to an embodiment of the invention.

In FIG. 4 a flow chart of an embodiment according to the second aspect can be seen. In a first step A a cylinder-shaped base portion is provided, wherein the base portion is made of steel, preferably a high temperature construction steel. In a second step B, the base portion is provided with an overlay portion on its outer peripheral surface. The overlay portion is provided onto the base portion by any of weld cladding or laser cladding.

The invention claimed is:
1. A continuous caster roll for a continuous casting machine, comprising:
an overlay portion made of martensitic stainless steel that is clad on a steel base portion,
wherein the steel of the overlay portion consists of the following composition by weight percent:
C 0.05-0.09,
Mn 0.70-1.30,
Si 0.40-0.80,
Cr 12.00-14.00,
Ni 2.75-3.75,
Mo 0.40-0.80,
Nb 0.20-0.35,
Cu 1.00-2.00, and
Zr 0.20-0.35,
the balance being Fe and normally occurring impurities.

2. The continuous caster roll of claim 1, wherein the overlay portion contains less than 10 volume percent delta ferrite.

3. A continuous caster roll for a continuous casting machine, comprising:
an overlay portion made of martensitic stainless steel that is clad on a steel base portion,
wherein the steel of the overlay portion consists of the following composition by weight percent:
C 0.05-0.09,
Mn 0.70-1.30,
Si 0.40-0.80,
Cr 12.00-13.00,
Ni 3.50-4.50,
Mo 0.70-1.30, and
Nb 0.30-0.50,
the balance being Fe and normally occurring impurities.

4. The continuous caster roll of claim 3, wherein the overlay portion contains less than 10 volume percent delta ferrite.

5. A continuous caster roll for a continuous casting machine, comprising:
an overlay portion made of martensitic stainless steel that is clad on a steel base portion,
wherein the steel of the overlay portion consists of the following composition by weight percent:
C 0.05-0.09,
Mn 0.70-1.30,
Si 0.40-0.80,
Cr 12.00-14.00,
Ni 3.00-4.50,
Mo 0.70-1.30,
Nb 0.30-0.50, and
Cu 1.50-2.50,
the balance being Fe and normally occurring impurities.

6. The continuous caster roll of claim 5, wherein the overlay portion contains less than 10 volume percent delta ferrite.

* * * * *